March 28, 1961 A. C. ELLSWORTH 2,977,292
PROCESS OF TREATING METAL HALIDES
Filed July 23, 1957
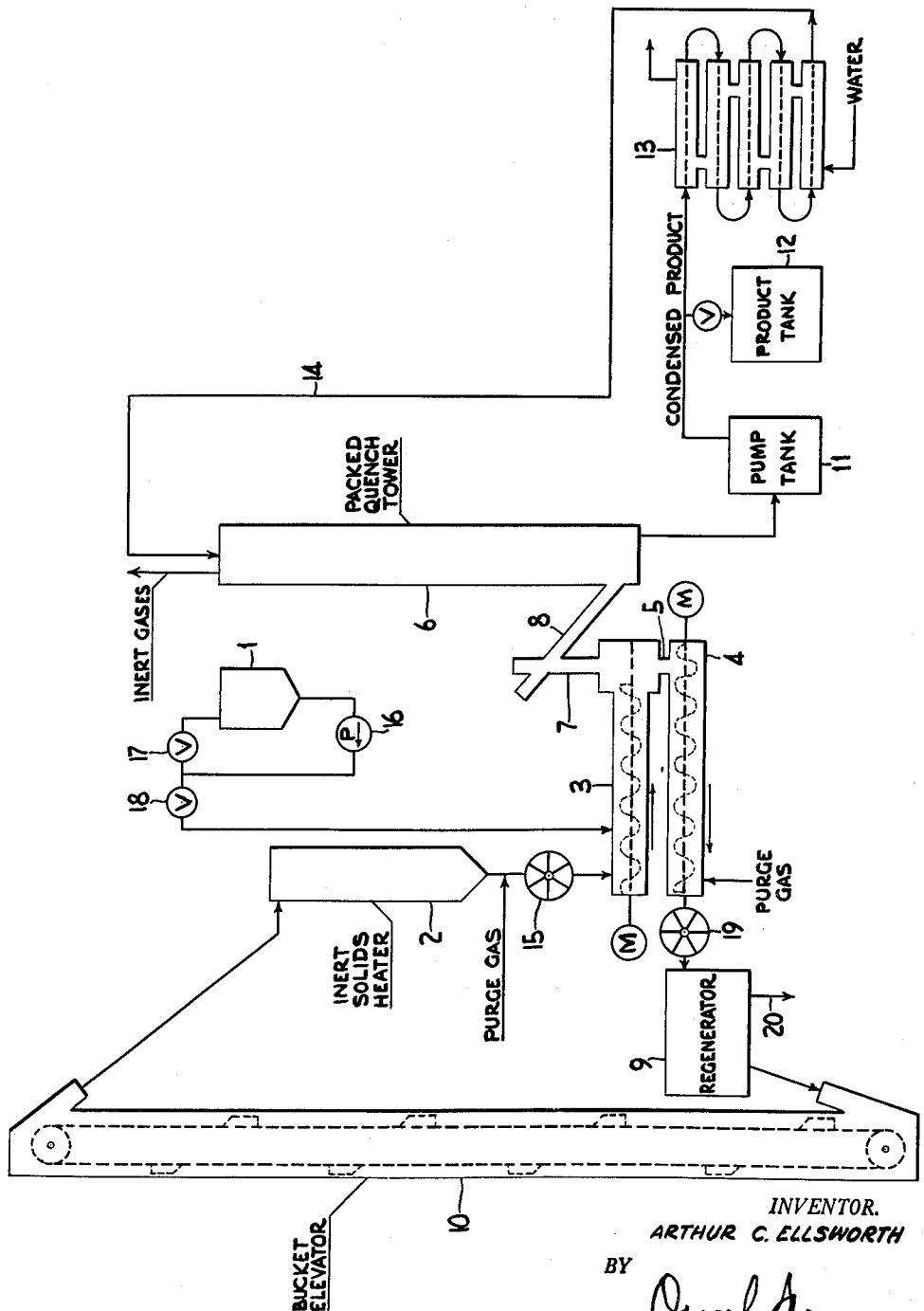
INVENTOR.
ARTHUR C. ELLSWORTH
BY Oscar L. Spencer
ATTORNEY

United States Patent Office 2,977,292
Patented Mar. 28, 1961

2,977,292

PROCESS OF TREATING METAL HALIDES

Arthur C. Ellsworth, Pittsburgh, Pa., assignor, by mesne assignments, to Pittsburgh Plate Glass Company Filed July 23, 1957, Ser. No. 673,662

10 Claims. (Cl. 202—72)

The present invention relates to the purification of metal halides. More particularly, the instant discovery concerns the purification of metal halides, such as titanium tetrachloride, by the use of heated inert solids, such as sand.

In the chlorination of titanium-bearing ores, such as ilmenite ore, rutile ore, and the like, by passing gaseous chlorine through a body comprising a mixture of the titanium-bearing ore and carbon, a substantial quantity of iron chloride is produced along with the titanium tetrachloride. Under the conditions and at the temperatures required to produce the titanium tetrachloride, chlorine reacts with the iron content of the ore to produce ferrous and ferric chlorides.

The art has found these products, i.e., $TiCl_4$ and iron chlorides, difficult of separation because of the fact that the iron chloride solids formed upon condensation of the vaporous products of chlorination are both adhesive and cohesive and, as a consequence, plug and clog purification apparatus to the extent that frequent shutdowns and somewhat hazardous conditions result.

For example, when purifying by fractionally cooling the vaporous products of reaction to effect removal of ferric chloride in solid form to the exclusion of ferrous chloride and titanium tetrachloride, ferric chloride solids adhere to the inner surfaces of the coolers and eventually seriously interrupt heat exchange or, depending upon the diameter of the coolers, completely interrupt the flow of vapors therethrough by plugging. Furthermore, the delicate temperature control required to selectively remove ferric chloride in solid form is, for all practical purposes, difficult to achieve. Consequently, liquid ferrous chloride also condenses on the surfaces of the cooler, thus producing a very sticky mixture of ferric chloride solids and ferrous chloride liquid condensate having a muddy consistency. An accumulation of this mixture quickly forms which results in the clogging and plugging referred to above.

These and many other serious difficulties have long plagued the art to such a degree that purification has heretofore been realized only at considerable expense. Difficulties of the type hereinabove described lead to frequent shutdowns and cumbersome cleaning chores, and, in some cases, the expense has been almost prohibitive.

According to the present invention, however, the above difficulties have been overcome with a minimum of expense and with an unprecedented ease of operation and maintenance.

The present discovery comprises contacting a slurry of metal halides with a stream of inert particulate solids heated to a temperature sufficient to volatilize one or more of the metal halides in the slurry, the remaining metal halide or halides being deposited with the inert solids. Volatilized metal halides are removed as vapors from the stream and the unvolatilized metal halides collected with the inert solids may be conveyed therewith to a separation zone wherein the solids are rid of the unvolatilized halides.

For example, a slurry containing a normally liquid metal halide and a normally solid metal halide is introduced into a moving body of inert, particulate solids, such as gravel, sand, or the like, preheated to a temperature sufficient to vaporize the normally liquid portion and insufficient to volatilize or vaporize the normally solid portion of the slurry. The resulting vaporized portion is removed from the solids and the solid portion collected or deposited with the inert solids from which it may be separated, as will be seen hereinafter, by screening or the like.

In a specific embodiment of the present invention, a slurry comprising (at ambient temperature) liquid titanium tetrachloride and iron chloride solids is introduced into a moving body of gravel, sand, or the like, the particulates of which average about ⅛ inch in diameter and are preheated to a temperature of about 360° C. whereby the titanium tetrachloride is vaporized and the iron chloride removed with the moving stream of particulates. Particularly desirable results are achieved by conveying the inert particulates by means of a screw conveyor along a defined path. At a point intermediate the feed and discharge ends of the conveyor carrying hot solids, i.e., intermediate the ingress and egress points provided in the vaporization zone for the intake and removal of solids, respectively, a metal halide slurry is fed into the solids. The lower-boiling metal halides are vaporized and the higher-boiling metal halides are removed with the particulates. Provision is made, as will be seen, to remove the vaporized material from the conveyor zone. The chloride solids thus removed are physically or chemically separated from the solids in a subsequent step, thus regenerating the inert particulates.

Slurries contemplated herein are generally prepared by totally condensing vaporous metal halide products of reaction, such as products resulting from the chlorination of titanium-bearing ores, zirconium-bearing ores, tin-bearing ores, aluminum-bearing ores, etc., wherein one portion of the condensed vapors is in a liquid state and another portion is in a solid state. For example, most of these ores have associated therewith a significant quantity of iron which may be removed as iron chloride according to the teachings of the present invention. The zirconium-bearing ores, upon chlorination and condensation of the resulting product gases, however, yield a product comprising predominantly liquid $SiCl_4$ and $ZrCl_4$ solids. Treatment of this product slurry as taught herein is a very efficient method of recovering substantially-pure $ZrCl_4$.

The metal halide slurries contemplated herein generally have a normally liquid portion to normally solid portion weight ratio ranging from about 2 to 1 to about 20 to 1, preferably between about 4 to 1 and 12 to 1, although greater than 20 to 1 ratio slurries are within the purview of the instant disclosure.

The inert, particulate solids are usually heated to a temperature from about 66° C. to about 450° C., or higher, depending upon the particular metal halides being treated. For example, when a slurry having $TiCl_4$ as its normally liquid portion and iron chloride as its normally solid portion, the slurry being at ambient temperature (22° C., plus or minus 5°), is contacted with inert, particulate solids of the type contemplated herein, the solids are preferably preheated to a temperature between 287° C. and 398° C.

In addition while inert, particulate solids of various sizes may be employed, generally the solids or pebbles average between ⅟₁₆ to 2 inches in diameter, preferably about ⅛ to ¾ inch.

Also within the purview of the present invention are metal halides which have been prepared by halogenating with bromine or iodine, or bromide and iodide derivatives thereof, as well as chlorine and chlorides.

The present invention will best be understood by reference to the drawing which is a schematic flow diagram of a preferred embodiment of the present invention. While only certain of the advantages of the instant discovery and only certain specific features thereof will be described hereinafter, it will be obvious to the skilled chemical engineer that numerous modifications of the invention can be practiced without departing from the spirit and breadth thereof. Consequently, the limitations and details given in the preferred embodiments of the discovery are by no means intended to limit the scope of the invention.

Referring now to the drawing, a head tank 1 and an inert solids heater 2 are provided for the simultaneous introduction of a metal halide slurry and heated inert solids, respectively, into screw conveyor 3. The heated inert solids feed to conveyor 3 is controlled by rotary feeder 15 whilst the slurry feed is controlled by pump 16 and valves 17 and 18 as shown. Whenever valve 18 is closed, valve 17 is kept open to provide continuous flow of slurry to and from tank 1. This prevents clogging. A second screw conveyor 4 is in communication with the solids discharge end of screw conveyor 3 by means of conduit 5.

Also in communication with screw conveyor 3 at its discharge end is vertical tower 6 which communicates with conveyor 3 through conduit legs 7 and 8.

Screw conveyor 4, in turn, discharges through rotary feeder 19 into regenerator or separator 9 which empties into bucket elevator 10. Bucket elevator 10 returns inert solids to heater 2. Metal halide solids separated in regenerator 9 are removed therefrom through conduit leg 20.

Quench tower 6 empties from its lower portion into pump tank 11 which distributes its contents to product tank 12 and heat exchanger or cooler 13. From cooler 13 product material passes via conduit 14 into the top of tower 6.

In operation, a metal halide slurry of the type contemplated herein is fed from head tank 1 into screw conveyor 3 at a controlled rate by means of pump 16 and valves 17 and 18, as shown in the drawing. At the same time, inert solids heated to a predetermined temperature are fed from heater 2 through rotary valve 15 into screw conveyor 3. As the solids pass through screw conveyor 3 at said predetermined temperature, they convert the slurry admixed therewith into a volatilized component and an unvolatilized component, the volatilized component passing through conduits 7 and 8 into tower 6 where they are condensed and introduced into pump tank 11, condensation taking place by means of cooled metal halide condensate return fed from pump tank 11 to water cooler 13 and upwardly through conduit 14 into the upper portion of tower 6. That portion of the product not employed in the cooling system is fed to product tank 12 as shown.

The unvolatilized component of the metal halide slurry fed into screw conveyor 3 is collected therein and conveyed as a solid with inert solids passing therethrough. These solids are, in turn, discharged into screw conveyor 4 via conduit 5. From conveyor 4 the solids are fed to separator 9 where the unvolatilized component is separated from the inert solids. Separator or regenerator 9 discharges the regenerated particulates into an elevator 10 which transports them to heater 2 for re-heating and return to screw conveyor 3, the unvolatilized component being removed through conduit 20.

According to the invention, it has been found that purification is greatly enhanced if a purge gas, such as dry air, is passed through screw conveyors 3 and 4 (as shown in the drawing) to effectively direct the volatilized metal halide products to the condensation zone, such as tower 6. The advantages accruing from this step are numerous. In the first place, the purging step greatly increases the percent product recovery by reducing product losses and by lowering the vapor pressure of the volatilized component, substantially reduces corrosion of the equipment and, in general, enhances the ease with which the operation is carried out.

These and many other features of the present invention will be better understood and appreciated from the following example which is intended to illustrate the instant discovery but which is by no means intended as a limitation thereon:

*Example I*

A metal halide slurry containing 294 pounds of titanium tetrachloride and 49 pounds of ferrous chloride solids (including small amounts of ferric chloride, coke and $TiO_2$ ore) in head tank 1 is fed by means of pump 16 and valves 17 and 18 shown in the drawing at a controlled rate of about 2.86 pounds per minute and at ambient temperature to screw conveyor 3. Simultaneously, pebbles averaging about ⅛ inch in diameter and heated to a temperature of 360° C. in heater 3 are fed through rotary valve 15 to screw conveyor 3 at the rate of about 20 pounds per minute.

Simultaneously, also, dry air purge gas at the rate of about 3.73 standard cubic feet per minute is fed into screw conveyor 3 as shown in the drawing. So also dry air purge gas at the rate of about 3.48 standard cubic feet per minute is fed into screw conveyor 4 as shown.

A vapor containing predominantly $TiCl_4$ and having a temperature of 210° C. is emitted from screw conveyor 3 through legs 7 and 8 and passed to quench tower 6.

The screws employed in this particular run are 4 inches in diameter. The pebbles passing from screw conveyor 4 via rotary valve 19 into regenerator 9 are accompanied by a dry, fluffy material which is removed by tumbling in the regenerator 9 which is a rotary screen. The dry, fluffy material is removed from regenerator 9 via conduit leg 20 and the regenerated pebbles directed, as shown, to bucket elevator 10 which, in turn, returns them to heater 2 for reuse in the system.

The vaporous $TiCl_4$ admitted from screw conveyor 3 via legs 7 and 8 is condensed in tower 6 and the resulting liquid product directed to pump tank 11 which feeds a major portion thereof to product tank 12 and a minor portion to cooler 13. The cooled product from cooler 13 is introduced into quench tower 6 via conduit 14 for the purpose of cooling vapors, according to conventional methods, entering through conduit 8.

A total of 278 pounds of $TiCl_4$ and 19 pounds of solids are removed as product from the slurry feed, the remainder of the solids being removed as dry, fluffy material by means of the heated pebbles. This represents a yield of slightly less than 95 percent $TiCl_4$ recovery. The pebbles exiting from screw conveyor 4 have an average temperature of about 268° C.

It can be readily seen that the above process affords an efficient and very inexpensive process for the purification of metal halide slurries. While the example given has particular reference to titanium tetrachloride slurries containing iron chloride solid impurities, the present invention is by no means limited thereto, as stated hereinabove. Slurries containing mixtures of metal halides in which the products sought to be recovered are removed as solids with the inert particulates are contemplated herein. In such a case, the impurity could be removed as a vapor and either vented to the atmosphere or collected for further purification. For example, as also stated hereinabove, a slurry in which the predominant solid constituent is zirconium tetrachloride could be effectively treated as above with the changes in temperature necessitated by the liquid portion of the slurry. These and many other applications obvious to the skilled chemical engineer are within the purview of the present invention.

Among other purge gases contemplated herein are nitrogen, dry $CO_2$, noble gases, such as argon, etc., or any gas which is inert under the conditions. The inert purge gas is generally introduced into the slurry-solids contact zone at a point upstream from the point of introduction of the slurry into said zone and at a point downstream from the point at which the volatilized component of the slurry is removed from said zone. Depending upon the degree of vaporization, the size of the slurry-solids contact zone, sufficient inert gas is introduced into the zone to sweep the vaporized components from the zone and to prevent migration of the components from the zone, such as escape through the inert solids' ingress and egress points to and from the slurry-solids contact zone.

The weight ratio of the inert solids and slurry fed to the slurry-solids contact zone is preferably between about 3 to 1 and 10 to 1, generally between about 1 to 1 and 30 to 1.

It is also apparent that certain of the specific apparatus employed in Example I, such as the packed tower, the regenerator, the bucket elevator, etc., may be substituted with equivalent equipment without deviating from the scope of the discovery.

Also contemplated herein are metal halide slurries in which the liquid portion is carbon tetrachloride, trichlorethylene, perchlorethane or other similar inert liquids. For example, the gaseous effluent products resulting from the halogenation at elevated temperatures of metal oxides, such as zirconium oxides, titanium oxides, uranium oxides, thorium oxides, and the like, may be quenched with carbon tetrachloride or the like. The resulting metal halide slurries having inert quenching liquids as their liquid portion may be treated as taught herein with hot, inert, particulate solids.

It can be seen from the above description and the several embodiments disclosed that the present invention provides a process of purifying metal halide slurries with substantially no encrustation or clogging due to the adhesion of solids to the apparatus. Furthermore, and what is very much unexpected, there is substantially no adhesion or encrustation of metal halide solids on the surfaces of the inert, particulate solids. This is indeed surprising and the reason therefor is not fully understood.

Nevertheless, it has been found that little or no metal halide encrustation on the inert solids or contamination thereof occurs in the process of the present invention. This very significantly enhances the separation of the metal halide solids from the inert solids and permits the continuous re-use of the inert solids for an extended period of time.

While the present invention has been defined in detail with respect to certain specific embodiments thereof, it is not intended that these details impose any limitations upon the breadth and scope of the discovery.

I claim:

1. A method comprising separating metal halide components from a slurry of solid and liquid metal halides which comprises heating inert, particulate solids to a temperature above the volatilization point of a portion of the slurry, establishing a moving stream of the hot, inert solids, introducing the slurry into the moving stream, volatilizing a portion of the slurry by contact thereof with the inert solids in the moving stream, removing the vapors produced by the volatilization from the moving stream, and forming a deposit of the unvolatilized portion of the slurry in the moving stream.

2. A method comprising separating metal halide components from a mixture of solid and liquid metal halides which comprises heating inert, particulate solids to a temperature above the volatilization point of a portion of the slurry, establishing a moving stream of the lot, inert solids, introducing said mixture into the moving stream, volatilizing a portion of the mixture by contact thereof with the inert solids in the moving stream, removing the vapors produced by the volatilization as formed, collecting the unvolatilized portion of the mixture in the moving stream and separating the inert solids from the unvolatilized portion of the mixture.

3. The method of claim 2 wherein an inert gas is introduced into the moving stream upstream from the point of introduction of the mixture to sweep the vapors therefrom.

4. A method comprising separating metal halide components from a slurry of solid and liquid metal halides which comprises heating inert, particulate solids to a temperature above the vaporization temperature of a portion of the slurry, conveying a stream of the hot solids over a defined path including an inert solids ingress and an inert solids egress, projecting a stream of the slurry into the hot inert solids at a point in the path spaced from the ingress and egress to volatilize a portion of the slurry and to form a deposit of the unvolatilized portion of the slurry in the moving stream of hot inert solids, removing the vapors produced by the volatilization from the path at a point between the point of introduction of the slurry and the egress, and collecting the inert solids and unvolatilized portion of the slurry after the stream has passed through the egress.

5. A method of separating a slurry comprising liquid titanium tetrachloride and solid metal chlorides which comprises heating inert, particulate solids to a temperature above the volatilization temperature of titanium tetrachloride but below the volatilization temperature of the solid metal chlorides, conveying a stream of the hot inert solids over a defined path extending from an inert solids ingress to an inert solids egress, projecting a stream of the slurry into the path traversed by the stream of inert solids to volatilize the titanium tetrachloride, and to collect said solid metal chlorides in the moving stream of inert solids, removing the titanium tetrachloride vapors produced by the volatilization from the path at a point between the point of slurry introduction and the egress, and withdrawing the inert solids and the deposit from the path through the egress.

6. The method of claim 5 wherein the inert solids are preheated to a temperature between 287° C. and 398° C. prior to entering said zone.

7. A method comprising separating metal halide components from a slurry of liquid and solid metal halides which comprises heating inert, particulate solids to a temperature above the volatilization point of a portion of the slurry, establishing a zone having an inert solids ingress and egress with a defined path therebetween, moving a stream of the hot inert solids into said zone through said ingress and over said defined path, introducing the slurry into the moving stream at a point in the path between the ingress and egress to volatilize a portion of the slurry and to collect the unvolatilized portion of the slurry in said stream, removing the vapors produced by the volatilization from said path at a point intermediate the point of slurry introduction and the egress, passing the stream of inert solids and collected unvolatilized portion of the slurry through said egress, and separating the unvolatilized portion of the slurry from the inert solids.

8. The process of claim 7 in which the slurry comprises predominantly liquid titanium tetrachloride and iron chloride solids.

9. The process of claim 7 in which an inert gas is introduced into said zone at a point upstream from the point of introduction of the slurry into said zone and at a point downstream from the point at which the volatilized portion of the slurry is removed from said zone to sweep the volatilized portion therefrom and to prevent migration of said portion from the zone save through the point provided for the removal thereof from the zone.

10. The process of claim 9 in which the inert gas is dry air.

References Cited in the file of this patent

UNITED STATES PATENTS

| | | |
|---|---|---|
| 2,463,396 | Krchma | Mar. 1, 1949 |
| 2,522,679 | Kroll | Sept. 19, 1950 |
| 2,614,028 | Schaumann | Oct. 14, 1952 |
| 2,718,279 | Kraus | Sept. 20, 1955 |
| 2,758,073 | Krebs et al. | Aug. 7, 1956 |
| 2,815,091 | Mas et al. | Dec. 3, 1957 |